United States Patent [19]

Sherwood et al.

[11] Patent Number: 4,484,631

[45] Date of Patent: Nov. 27, 1984

[54] USE OF POLYAMPHOLYTES TO ENHANCE OIL AND/OR GAS RECOVERY

[75] Inventors: Nancy S. Sherwood; Christine A. Costello, both of Coraopolis; Gary F. Matz, Pitcairn, all of Pa.

[73] Assignee: Calgon Corporation, Pittsburgh, Pa.

[21] Appl. No.: 411,167

[22] Filed: Aug. 25, 1982

[51] Int. Cl.$^3$ .............................................. E21B 43/22
[52] U.S. Cl. .................................. 166/274; 166/294; 252/8.55 D
[58] Field of Search ................... 252/8.55 D, 8.55 R; 166/294, 275, 274

[56] References Cited

U.S. PATENT DOCUMENTS

| | | | |
|---|---|---|---|
| 3,624,019 | 11/1971 | Anderson et al. | 252/8.55 X |
| 3,658,772 | 4/1972 | Volk et al. | 526/307.6 X |
| 3,679,000 | 7/1972 | Kaufman | 252/8.55 X |
| 3,721,295 | 3/1973 | Bott | 166/294 |
| 3,744,566 | 7/1973 | Szabo et al. | 252/8.55 X |
| 3,804,173 | 4/1974 | Jennings | 252/8.55 |
| 3,826,311 | 7/1974 | Szabo et al. | 266/294 X |
| 4,137,969 | 2/1979 | Phalangas et al. | 252/8.55 X |
| 4,246,124 | 1/1981 | Swanson | 252/8.55 |
| 4,330,450 | 5/1982 | Lipowski et al. | 524/547 |

FOREIGN PATENT DOCUMENTS 2044321A  3/1980  United Kingdom .

*Primary Examiner*—Herbert B. Guynn
*Attorney, Agent, or Firm*—R. Brent Olson; William C. Mitchell

[57] ABSTRACT

The instant invention is directed to a method of recovering oil and/or gas from a subterranean formation which is penetrated by a well bore, and for reducing the concomitant production of reservoir water therefrom comprising injecting into said formation through said well bore an aqueous treating solution or emulsion containing a polyampholyte prepared from:

(i) 40 to 90%, by weight, of at least one anionic-containing monomer;

(ii) 0.5 to 60%, by weight, of at least one cationic-containing monomer; and (iii) 0 to 59.5%, by weight, of at least one non-ionic monomer.

4 Claims, No Drawings

USE OF POLYAMPHOLYTES TO ENHANCE OIL AND/OR GAS RECOVERY

BACKGROUND OF THE INVENTION

In producing oil from both natural and artificial water driven oil reservoirs, the wells ultimately produce sufficiently large volumes of connate water to constitute a serious operating problem and eventually production of the water forces abandonment of the well. The cost of raising water to the earth's surface and of separating it from the oil represents an economic loss and, in addition, in many instances, there is a problem in disposal of the waste water. Even more importantly, the total volume of fluid that can be produced daily is often limited by the well bore and artificial lift equipment so that water production unnecessarily reduces the oil production rate. In many instances, a portion of the reservoir is producing essentially all water, while the remainder is producing a substantial quantity of oil. If production from the watered-out portion of the reservoir is eliminated or reduced, the production, handling and disposal of large volumes of water is avoided. Certain polymers can reduce the water:oil production ratio so more oil is produced while handling less water. This results in major savings in operating costs, the avoidance of unnecessary depletion of the water drive, and increased production from the remaining oil interval which results in greater ultimate recovery and greater current income.

U.S. Pat. No. 4,330,450 is directed to amphoteric water-in-oil self-inverting polymer emulsions containing 1 to 35 pbw anionic monomer in the polymer. The primary use disclosed is in papermaking. Their use in secondary and tertiary oil recovery is suggested. However, polymers containing 1 to 35 pbw of anionic monomer were found to be poor polymers to enhance oil recovery.

DESCRIPTION OF THE INVENTION

The instant invention is directed to a method of recovering oil and/or gas from a subterranean formation which is penetrated by a well bore, and for reducing the concomitant production of reservoir water therefrom comprising injecting into said formation through said well bore an aqueous treating solution or emulsion containing a polyampholyte prepared from:

(i) 40 to 90%, by weight, of at least one anionic-containing monomer;
(ii) 0.5 to 60%, by weight, of at least one cationic-containing monomer; and
(iii) 0 to 59.5%, by weight, of at least one non-ionic monomer.

The concentration of amphoteric polymer treating agent in the aqueous solution pumped down the well may vary over a wide range, from about 1 ppm to about 5 percent by weight. The optimum concentration will depend, to a large extent, upon the volume of reservoir water with which the treating solution will be diluted in the formation and the crude oil viscosity. It is preferred to adjust the concentration of treating agent, and the volume of the aqueous slug injected, so that the concentration of treating agent in the formation waters will be between about 0.01 percent and 0.5 percent by weight. It is further preferred that the volume of the aqueous slug injected be between about 0.02 percent and 5 percent of the oil volume in the oil recovery area around the given producing well being treated.

In carrying out the process of this invention, conventional injection procedures are employed, i.e., the well to be treated is suitably fitted with packers, if required, and the aqueous treating agent is forced down the well bore and out into the reservoir formation by means of conventional pumping equipment (if required) located at the well head.

For a producing well, the injection can be completed in about ½ to 3 days, after which the well may be immediately placed back on production. The initial well effluent following the treatment is sharply reduced in water/oil ratio, and production may be continued for several weeks or months with improved oil recovery and reduced water production. Gradually, however, the water/oil ratio will begin to rise again, and when the ratio reaches an undesirably high level, the well may be again shut in and the treatment repeated to again improve production.

For secondary and tertiary enhanced oil recovery, a polymer slug is followed by water, in a pattern of injection wells, until a satisfactory sweep of the producing formation has been obtained.

The process of this invention may be used in water-flooding (injection well), tertiary recovery or a producing well, either an oil well or a gas well. The producing well may be operating under natural flow conditions, or it may be a producing well involved in a secondary recovery operation wherein a flooding medium, or gaseous driving medium is being injected into an adjacent well. It is contemplated that in such secondary recovery operations, treatment of the producing well will cause the selective diversion of reservoir waters to other wells, or to adjacent aquafer structures, thus reducing the water/oil ratio in the producing well effluent.

Any polyampholyte, or the salt thereof, may be used. A polyampholyte is a polymer containing anionic, cationic and optionally nonionic mer units.

Although any polyampholyte may be used, it is preferably prepared from:

(i) at least one anionic-containing monomer of the formula:

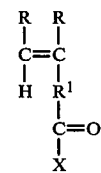

wherein
R, which may be the same or different, is hydrogen, a phenyl or an alkyl group of from 1 to 3 carbon atoms, preferably hydrogen, methyl or ethyl,
$R^1$ is a straight or branched chain of from 0 to 12 carbon atoms, referably 0 to 3, and
X is $-NHCH_2C(CH_3)_2SO_3Y$ or OY, and
Y is hydrogen or an alkali or alkaline earth metal, preferably hydrogen, sodium, potassium or cesium;
(ii) at least one cationic-containing monomer; and
(iii) optionally, non-ionic monomer.

Any anionic-containing monomer, or its salt, may be used. Examples include acrylic acid, methacrylic acid, vinyl acetic acid, allylacetic acid, crotonic acid, 4-methyl-4-pentenoic acid and acrylamido methyl propane sulfonic acid. The preferred anionic-containing monomers are acrylic acid, methacrylic acid and acrylamido methyl propane sulfonic acid. Mixtures of anionic-containing monomers may be used in preparing the polyampholyte.

Any cationic-containing monomer may be used. The preferred cationic-containing monomers are:

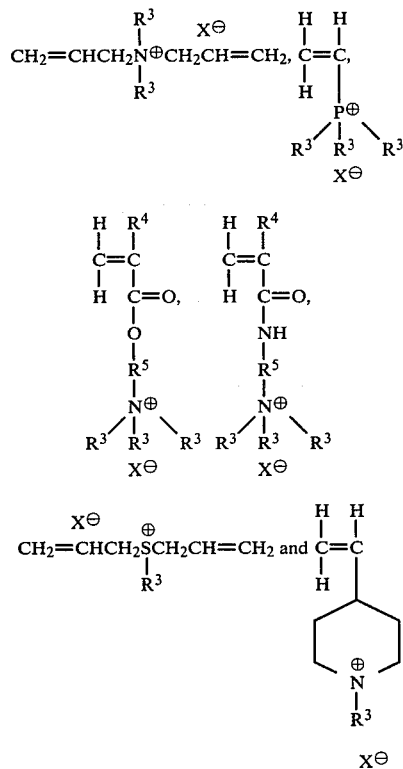

wherein
$R^3$ is hydrogen, a phenyl, or an alkyl group of from 1 to 3 carbon atoms;
$R^4$ is a hydrogen or an alkyl group of from 1 to 3 carbon atoms, preferably a hydrogen or methyl group,
$R^5$ is a straight or branched chain of from 1 to 12 carbon atoms, preferably 1 to 3 carbon atoms; and
X is an anion, preferably a halogen or alkyl sulfate.

X may be any anion in the above formula. Examples include halogen, sulfate, sulfonate, phosphate, hydroxide, borate, cyanide, carbonate, thiocyanate, thiosulfate, isocyanate, sulfite, bisulfite, nitrate, nitrite, oxalate, silicate, sulfide, cyanate, acetate and the other common inorganic and organic ions.

Specific examples of the most preferred cationic-containing monomers include diethyldiallyl ammonium chloride, dimethyldiallyl ammonium chloride, methacryloyloxy ethyl trimethyl ammonium methylsulfate and methacrylamido propyl trimethyl ammonium chloride. The most preferred cationic monomer is methacryloyloxy ethyl trimethyl ammonium methylsulfate. Mixtures of cationic-containing monomers may be used in preparing the polyampholyte.

The polyampholyte may also be prepared by polymerizing a monomer containing a tertiary amine as the pendant group with subsequent quaternization of the nitrogen in the polymer to form the cationic mer units. Likewise, sulfur and phosphorus-containing monomers may be exhaustively methylated to form cations.

Any non-ionic monomer may optionally be used. Examples include: acrylamide, and its derivatives, such as methacrylamide, and N,N-dimethyl acrylamide; acrylonitrile; vinyl acetate; vinyl pyridine; butadiene; methacrylate, and its derivatives; and styrene, and its derivatives. The preferred non-ionic monomer is acrylamide. Mixtures of non-ionic monomers may be used in preparing the polyampholyte.

The most preferred polyampholytes are terpolymers prepared from:

(i) an anionic-containing monomer of the formula:

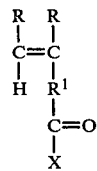

wherein
R, which may be the same or different, is hydrogen, a phenyl or an alkyl group of from 1 to 3 carbon atoms, preferably a hydrogen, methyl or ethyl,
$R^1$ is a branched or straight chain of from 0 to 12 carbon atoms, preferably 0 to 3,
X is $-NHCH_2C(CH_3)_2SO_3Y$ or OY, and
Y is hydrogen or an alkali or an alkaline earth metal, preferably hydrogen, sodium, potassium or cesium;

(ii) a monomer of the formula:

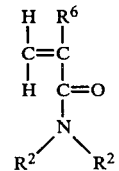

wherein
$R^6$ is hydrogen, a phenyl or an alkyl group of from 1 to 3 carbon atoms, preferably a hydrogen, methyl, or ethyl, and
$R^2$, which may be the same or different, is a hydrogen, or an alkyl group of from 1 to 3 carbon atoms; and (iii) a cationic-containing monomer containing an ion selected from the group consisting of a quaternary ammonium, phosphonium or sulfonium.

It is necessary that the polymer be prepared from 40 to 90%, most preferably 47 to 70%, by weight, anionic functional monomer; 0.5 to 60%, most preferably 1.5 to 33%, by weight, cationic monomer; and 0 to 59.5%, more preferably 1.5 to 58.5%, and most preferably 20 to 48%, by weight, non-ionic monomer. A higher percent of non-ionic monomer may be used, and subsequently hydrolyzed to a sufficient extent that the final percent is in the preferred range.

The polyampholyte may be prepared by mixing the monomers preferably in the presence of a free radical initiator. Any free radical initiator may be used. Examples include peroxides, azo initiators and redox systems.

The polymerization may also be initiated photochemically. The preferred catalysts are sodium persulfate or a mixture of ammonium-persulfate and any azo type initiator, such as 2,2'-azobis-(2,4-dimethyl-4-methoxyvaleronitrile).

The polyampholyte may be made by any of a variety of procedures, for example, in solution, suspension, bulk and emulsions.

The temperature is not critical. The reaction will generally occur between 10° and 100° C., preferably 40° to 60° C. It is generally impractical to run the reaction below room temperature because the reaction is too slow. Above a temperature of 60° C., the molecular weight of the polymer tends to decrease. The reaction, depending on the temperature, generally takes from 1 to 12 hours. Measuring for residual monomer will verify when the reaction is complete.

The pH of the reaction mixture is not critical. The pH is generally in the range of 4.5 to 9.0.

The percent solids in the reaction mixture is not critical. The preferred range is 1 to 50%, by weight, solids.

The molecular weight of ampholytic polymers is difficult to accurately measure. The polymers are, instead, usually identified by intrinsic viscosity. The intrinsic viscosity of the polyampholyte is not critical in the instant invention. The preferred intrinsic viscosity is above 10 dl/g in 1.0M sodium chloride (measured on a 75 Cannon Ubbelohde Capillary Viscometer).

The following examples are cited to illustrate the invention, and to demonstrate the beneficial results obtained therefrom but are not to be construed as limiting in scope.

EXAMPLES

Preparation of the Polymers

Polymers 4 and 5 of Table I were produced by mixing the cationic, anionic and nonionic monomers in the ratios indicated in Table I, at 30% solids concentration, initial temperature of 50° C., and pH of 4.5. The monomer mix was purged with nitrogen for one hour. The solvent was deionized water. Initiator in an amount 0.003 moles sodium persulfate/mole monomer mix was added and the components allowed to react for about three hours.

Polymers 6 through 12 of Table I were prepared by mixing the cationic, anionic and nonionic monomers in the ratios indicated in Table I. The solutions were then neutralized to a pH of 7.0 with 50% sodium hydroxide. Chain transfer agent and catalyst were added in the amounts indicated in Table I. The solutions were placed under fluorescent lights for sixty minutes. The resulting gels were diluted to 600 mg/l active polymer.

TABLE I

| Polymer Number | Composition | Initiator | Chain Transfer Agent | $[\eta]^9$ |
|---|---|---|---|---|
| 4 | 70/10/20 AA[1]/DMDAAC[2]/AM[3] | 0.28% Sodium Persulfate 0.0125% Sodium Metabisulfite | — | 2.0 |
| 5 | 47/10/43 AA/DMDAAC/AM | 0.28% Sodium Persulfate 0.0125% Sodium Metabisulfite | — | 0.55 |
| 6 | 70/10/20 AMPSA[4]/MAPTAC[5]/AM | $5.3 \times 10^{-5}$ M Riboflavin | 1% IPA[6] | 5.5 |
| 7 | 47/5/48 AA/METAMS[7]/AM | $5.3 \times 10^{-5}$ M Riboflavin | 1% IPA | 14.0 |
| 8 | 60/8/32 AA/DMDAAC/AM | $1.06 \times 10^{-4}$ M Riboflavin 0.053 M Sodium Persulfate | 1% IPA | 3.3 |
| 9 | 60/8/32 AA/METAMS/AM | $7.35 \times 10^{-5}$ M Riboflavin | 20% TEA[8] | 11.2 |
| 10 | 60/8/32 AA/DMDAAC/AM | $1.06 \times 10^{-4}$ M Riboflavin | 20% TEA | 5.1 |
| 11 | 60/8/32 AA/METAMS/AM | $7.35 \times 10^{-5}$ M Riboflavin | 2.1% TEA | >11.0 |
| 12 | 60/8/32 AA/METAMS/AM | $4.2 \times 10^{-5}$ M Riboflavin | 1.0% IPA | >11.2 |

[1]AA = acrylic acid
[2]DMDAAC = dimethyl diallyl ammonium chloride
[3]AM = acrylamide
[4]AMPSA = acrylamido methyl propane sulfonic acid
[5]MAPTAC = methacrylamido propyl trimethyl ammonium chloride
[6]IPA = isopropyl alcohol
[7]METAMS = methacryloyloxyethyl trimethyl ammonium methosulfate
[8]TEA = triethanol amine
[9][$\eta$] = intrinsic viscosity in 1.0 M NaCl

Test Procedure

All of the polymers were dissolved at 600 mg/l polymer concentration in deionized water and, in the lower half of the table, 2% sodium chloride Brookfield viscosities were measured at room temperature (25° C.). The viscosities at varying RPM are summarized in Table II.

TABLE II

| | Polymer No. | | | | | | | | | | | |
|---|---|---|---|---|---|---|---|---|---|---|---|---|
| RPM | 1 (Comparison Example) MPAM 35% SOLIDS | 2 (Comparison Example) 35% SOLIDS 70% NPAM 30% DMDAAC[2] | 3 (Comparison Example) MPAM 10% SOLIDS | 4 70% AA[3] 20% AM[4] 10% DMDAAC [n] = 2.0 dl/g | 5 47% AA 43% AM 10% DMDAAC [n] = .55 dl/g | 6 70% AMPS[5] 10% MAPTAC[6] 20% AM [n] = 5.5 dl/g 43.4% SOLIDS | 7 47% AA 5% METANE[7] 48% AM [n] = 14 dl/g 41.6% SOLIDS | 8 60% AA 8% DMDAAC 32% AM [n] = 3.3 dl/g 57.0% SOLIDS | 9 60% AA 8% METANE 32% AM [n] = 11.2 dl/g 16.7% SOLIDS | 10 60% AA 8% DMDAAC 32% AM [n] = 5.1 dl/g 49.0% SOLIDS | 11 60% AA 8% METANE 32% AM [n] > 11 dl/g 47.0% SOLIDS | 12 60% AA 8% METANE 32% AM [n] > 11.2 dl/g 53.0% SOLIDS |
| | Viscosity of Polymer in Deionized Water, Centipoise Brookfield Viscosity, #1 Spindle 600 mg/l, 25° C. | | | | | | | | | | | |
| 0.3 | 2520 | 300 | 460 | 700 | 500 | 120 | 3060 | 60 | 20 | 60 | 320 | 1468 |
| 0.6 | 1730 | 360 | 380 | 560 | 400 | 90 | 2130 | 50 | 20 | 20 | 320 | 1148 |
| 1.5 | 1004 | 274 | 292 | 440 | 320 | 94 | 1248 | 24 | 12 | 16 | 260 | 820 |
| 3.0 | 636 | 210 | 229 | 338 | 248 | 86 | 810 | 14 | 16 | 14 | 240 | 630 |
| 6.0 | 399 | 156 | 174 | 249 | 186 | 77 | 502 | 17 | 14 | 13 | 100 | 470 |
| 12.0 | 249 | 112 | 126 | 176 | 135 | 65 | 317 | 22 | 22 | 15 | 148 | 336 |
| 30.0 | 333 | 69 | 80 | 106 | 85 | 49 | 165 | 18 | 19 | 13 | 97 | 194 |
| 60.0 | 88 | 49 | 97 | 72 | 59 | 43 | Off scale (>100) | 17 | 19 | 9 | 79 | Off scale (>100) |
| | Viscosity of Polymer in 2% NaCl, Centipoise Brookfield Viscosity, UL Adapters 600 mg/l, 25° C. | | | | | | | | | | | |
| 1.5 | 6.1 | 3.4 | 2.6 | 6.0 | 5.0 | 4.4 | 6.4 | 3.6 | 3.6 | 4.4 | 4.9 | Sample Did Not Dissolve, Presumably due to Highly Cross-Linked Polymer |
| 3.0 | 4.9 | 3.2 | 2.5 | 4.0 | 4.0 | 3.6 | 5.4 | 2.6 | 4.4 | 3.4 | 2.6 | |
| 6.0 | 4.4 | 2.0 | 2.4 | 4.2 | 3.3 | 3.3 | 4.3 | 2.4 | 3.7 | 2.7 | 1.9 | |
| 12.0 | 4.0 | 2.5 | 2.2 | 3.6 | 2.8 | 3.3 | 3.7 | 2.0 | 3.0 | 2.2 | 1.6 | |
| 10.0 | 3.0 | 2.4 | 2.0 | 3.3 | 2.6 | 2.1 | 3.3 | 1.5 | 1.6 | 1.7 | 1.2 | |
| 60.0 | 3.6 | 2.3 | 1.9 | 3.1 | 2.4 | 1.9 | 3.1 | 1.3 | 2.6 | 1.6 | 1.1 | |

[1]NPAM = hydrolysed polyacrylamide
[2]DMAAC = dimethyl diallyl ammonium chloride
[3]AA = acrylic acid
[4]AM = acrylamide
[5]AMPS = acrylamide methyl propane sulfonic acid
[6]MAPTAC = methacrylamide propyl trimethyl ammonium chloride
[7]METANE = methacryloylethyl trimethyl ammonium methosulfate

What is claimed is:

1. A method of recovering oil and/or gas from a subterranean formation which is penetrated by a well bore, and for reducing the concomitant production of reservoir water therefrom comprising injecting into said formation through said well bore an aqueous treating solution or emulsion containing a polyampholyte, having an intrinsic viscosity greater than 10 dl/g in 1.0M sodium chloride, prepared from:
   (i) 40 to 90%, by weight, of at least one anionic-containing monomer of the formula:

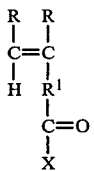

wherein
   R, which may be the same or different, is hydrogen, a phenyl or an alkyl group of from 1 to 3 carbon atoms,
   $R^1$ is a straight or branched chain of from 0 to 12 carbon atoms,
   X is $-NHCH_2C(CH_3)_2SO_3Y$ or OY, and
   Y is hydrogen or an alkali or alkaline earth metal;
   (ii) 0.5 to 60%, by weight, of at least one cationic-containing monomer selected from the group consisting of: diethyl diallyl ammonium chloride and dimethyl diallyl ammonium chloride; and
   (iii) 1.5 to 58.5%, by weight, of at least one non-ionic monomer selected from the group consisting of acrylonitrile, vinyl acetate, butadiene, vinyl pyridine, methacrylate, styrene and monomers of the formula:

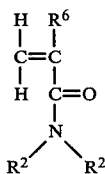

wherein
   $R^6$ is hydrogen, a phenyl or an alkyl group of from 1 to 3 carbon atoms, and
   $R^2$, which may be the same or different, is a hydrogen, or an alkyl group of from 1 to 3 carbon atoms,
   then terminating the injection of said treating solution and thereafter placing the treated well in production.

2. The method of claim 1, wherein said polyampholyte is prepared from an anionic-containing monomer selected from the group consisting of acrylic acid, methacrylic acid, vinyl acetic acid, crotonic acid, allylacetic acid, 4-methyl-4-pentenoic acid and acrylamide methyl propane sulfonic acid; dimethyldiallyl ammonium chloride; and a non-ionic monomer selected from the group consisting of acrylamide, methacrylamide, N,N-dimethylacrylamide, acrylonitrile, vinyl acetate, butadiene, vinyl pyridine, methacrylate, and styrene.

3. The method of claim 1, wherein said polyampholyte is prepared from:
   (i) 47 to 70%, by weight, of said anionic-containing monomer;
   (ii) 1.5 to 33%, by weight, of said cationic-containing monomer; and
   (iii) 20 to 48%, by weight, of said non-ionic monomer.

4. A method of recoverng oil from a subterranean formation which is penetrated by an injection well bore, and for reducing the concomitant production of reservoir water therefrom, comprising injecting into said formation through said injection well bore an aqueous treating solution or emulsion containing a polyampholyte, having an intrinsic viscosity greater than 10 dl/g in 1.0M sodium chloride, prepared from:
   (i) 40 to 90%, by weight, of at least one anionic-containing monomer of the formula:

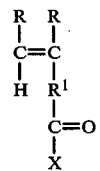

wherein
   R, which may be the same or different, is hydrogen, a phenyl or an alkyl group of from 1 to 3 carbon atoms,
   $R^1$ is a straight or branched chain of from 0 to 12 carbon atoms,
   X is $-NHCH_2C(CH_3)_2SO_3Y$ or OY, and
   Y is hydrogen or an alkali or alkaline earth metal;
   (ii) 0.5 to 60%, by weight, of at least one cationic-containing monomer selected from the group consisting of: diethyl diallyl ammonium chloride and dimethyl diallyl ammonium chloride; and
   (iii) 1.5 to 58.5%, by weight, of at least one non-ionic monomer selected from the group consisting of acrylonitrile, vinyl acetate, butadiene, vinyl pyridine, methacrylate, styrene and monomers of the formula:

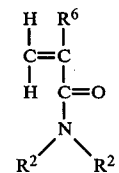

wherein
   $R^6$ is hydrogen, a phenyl or an alkyl group of from 1 to 3 carbon atoms, and
   $R^2$, which may be the same or different, is a hydrogen, or an alkyl group of from 1 to 3 carbon atoms,
   and then injecting water into said injection well bore, thereby producing oil from an adjacent producing well bore.

* * * * *

UNITED STATES PATENT OFFICE
CERTIFICATE OF CORRECTION

Patent No. 4,484,631　　　　　　　　Dated November 27, 1984

Inventor(s) Nancy S. Sherwood et al

It is certified that error appears in the above-identified patent and that said Letters Patent are hereby corrected as shown below:

In Column 2, Line 60, "referably" should read "preferably".

In Column 3, Lines 10-17,

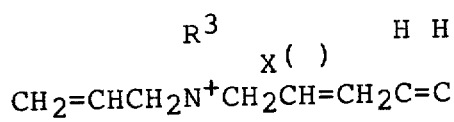

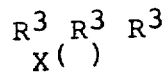

should read:

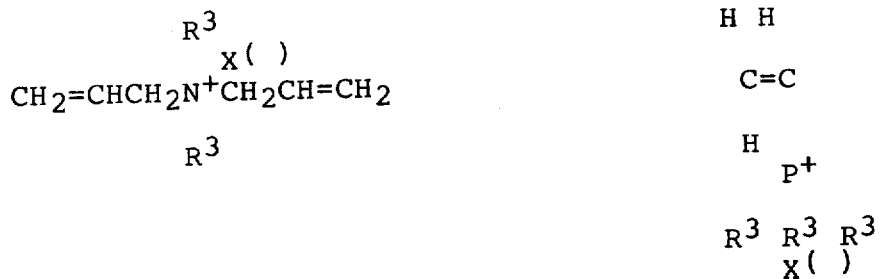

UNITED STATES PATENT OFFICE
CERTIFICATE OF CORRECTION

Patent No. 4,484,631　　　　　Dated November 27, 1984

Inventor(s) Nancy S. Sherwood et al

It is certified that error appears in the above-identified patent and that said Letters Patent are hereby corrected as shown below:

In Column 4, Line 31, "X is  NHCH$_2$C(CH$_3$)$_2$SO$_3$Y" should read "X is -NHCH$_2$C(CH$_3$)$_2$SO$_3$Y"

In Column 10, line 11, "recoverng" should read "recovering".

The following changes should be made in Table II:

Under RPM, prior to Column 1, Line 27, "10.0" should read "30.0"

Column 1, Line 10, "MPAM" should read "HPAM"
Column 1, Line 17, "133" should read "333"
Column 1, Line 18, "88" should read "80"
Column 1, line 27, "3.0" should read "3.8"
Column 2, Line 9, "35%" should read "25%"
Column 2, Line 11, "NPAM" should read "HPAM"
Column 2, Line 13, "300" should read "380"
Column 2, Line 25, "2.0" should read "2.8"
Column 3, Line 10, "MPAM" should read HPAM"
Column 3, Line 11, "10%" should read "18%"
Column 3, Line 19, "97" should read "57"
Column 4, Line 24, "4.0" should read "4.8"
Column 6, Line 11, "43.4%" should read "43.7%"

Column 6, Line 16, "77" should read "73"
Column 6, Line 27, "3.3" should read "2.3"
Column 8, Line 24, "2.6" should read "2.8"
Column 9, Line 8, "8% METANE" should read "8% METAMS"
Column 9, Line 15, "16" should read "10"
Column 9, Line 23, "3.6" should read "5.6"

UNITED STATES PATENT OFFICE
CERTIFICATE OF CORRECTION

Patent No. 4,484,631          Dated November 27, 1984

Inventor(s)  Nancy S. Sherwood et al

It is certified that error appears in the above-identified patent and that said Letters Patent are hereby corrected as shown below:

```
Column 10, Line 16, "13" should read "15"
Column 10, Line 18, "13" should read "15"
Column 11, Line 8,  "8% METANE" should read "8% METAMS"
Column 11, Line 16, "100" should read 190"
Column 11, Line 19, "79" should read "70"
Column 11, Line 23, "4.9" should read "4.0"
Column 12, Line 8,  "8% METANE" should read "8% METAMS"
Column 12, Line 13, "1468" should read "1460"
Column 12, Line 14, "1148" should read "1140"
```

Footnote 1, Line 29, "NPAM" should read "HPAM"; "hydrolysed" should read "hydrolyzed".

Footnote 2, Line 30, "Dialily" should read "diallyl".

Footnote 6, Line 34, "methacrylamide" should read "methacrylamido".

Footnote 7, Line 35, "methacryloylethyl" should read "methacryloyloxyethyl".

Signed and Sealed this

Twenty-third Day of July 1985

[SEAL]

Attest:

DONALD J. QUIGG

Attesting Officer      Acting Commissioner of Patents and Trademarks